US00RE34404E

United States Patent [19]

Dupont et al.

[11] E Patent Number: Re. 34,404

[45] Reissued Date of Patent: Oct. 12, 1993

[54] MOBILE PLATFORM WITH POWER OPERATED PLATFORM ELEVATION

[76] Inventors: Gaston L. Dupont, 30 Charles St., Holyoke, Mass. 01040; Andre G. Dupont, 644 Federal St., Belechertown, Mass. 01007

[21] Appl. No.: 524,513

[22] Filed: May 17, 1990

Related U.S. Patent Documents

Reissue of:

[64] Patent No.: 4,886,139
Issued: Dec. 12, 1989
Appl. No.: 234,353
Filed: Aug. 19, 1988

[51] Int. Cl.[5] ..... E04G 1/20

[52] U.S. Cl. ..... 182/146; 182/132; 182/223

[58] Field of Search ..... 182/145, 146, 147, 82, 182/63, 129, 127, 132, 229

[56] References Cited

U.S. PATENT DOCUMENTS

| | | | |
|---|---|---|---|
| D. 157,023 | 1/1950 | Ashenfelter | D54/1 |
| D. 208,630 | 9/1967 | Coblentz | D15/8 |
| D. 252,408 | 7/1979 | Dempewolf | D25/66 |
| D. 265,425 | 7/1982 | Graas | D25/66 |
| 411,363 | 9/1889 | Williams | 182/145 |
| 623,269 | 4/1899 | Wilber | 182/146 |
| 1,616,743 | 2/1927 | Ericsson | 182/145 |
| 3,156,317 | 11/1964 | Lundeen | 182/146 |
| 3,169,604 | 2/1965 | Pranger | 182/146 |
| 3,323,616 | 6/1967 | Best | 182/146 |
| 3,378,101 | 4/1968 | Zeitler | 182/146 |
| 3,438,460 | 4/1969 | Solari | 182/146 |
| 3,576,233 | 4/1971 | Thatcher | 182/145 |
| 4,000,789 | 1/1977 | Zahner | 182/63 |
| 4,088,203 | 5/1978 | Smith, Jr. | 182/141 |
| 4,137,994 | 2/1979 | Wood | 182/2 |
| 4,171,033 | 10/1979 | Rust | 182/145 |
| 4,365,692 | 12/1982 | Craig et al. | 187/8.72 |
| 4,391,345 | 7/1983 | Paul | 182/141 |
| 4,641,728 | 2/1987 | McCabe | 182/146 |
| 4,701,097 | 10/1987 | Sturtz | 414/495 |

FOREIGN PATENT DOCUMENTS 3102468 9/1982 Fed. Rep. of Germany .

*Primary Examiner*—Karen J. Chotkowski
*Attorney, Agent, or Firm*—Henderson & Sturm

[57] ABSTRACT

A portable scaffold includes a base or chassis mounted on wheels for site-to-site towing or "man-handled" positioning at a job site. Rising rigidly from the chassis are two masts, spaced apart lengthwise of the chassis. A platform is vertically slidably carried by the mast for selective elevation and descent via power devices. Each mast may be increased in height by the addition thereto of a mast extension that functions as a prolongation of the basic mast. One of the power devices is alternately positionable to function as a temporary source of power for moving the scaffold through short distances. Strap elements are provided for temporarily bracing the masts from a structure being worked on by workmen on the platform.

19 Claims, 5 Drawing Sheets

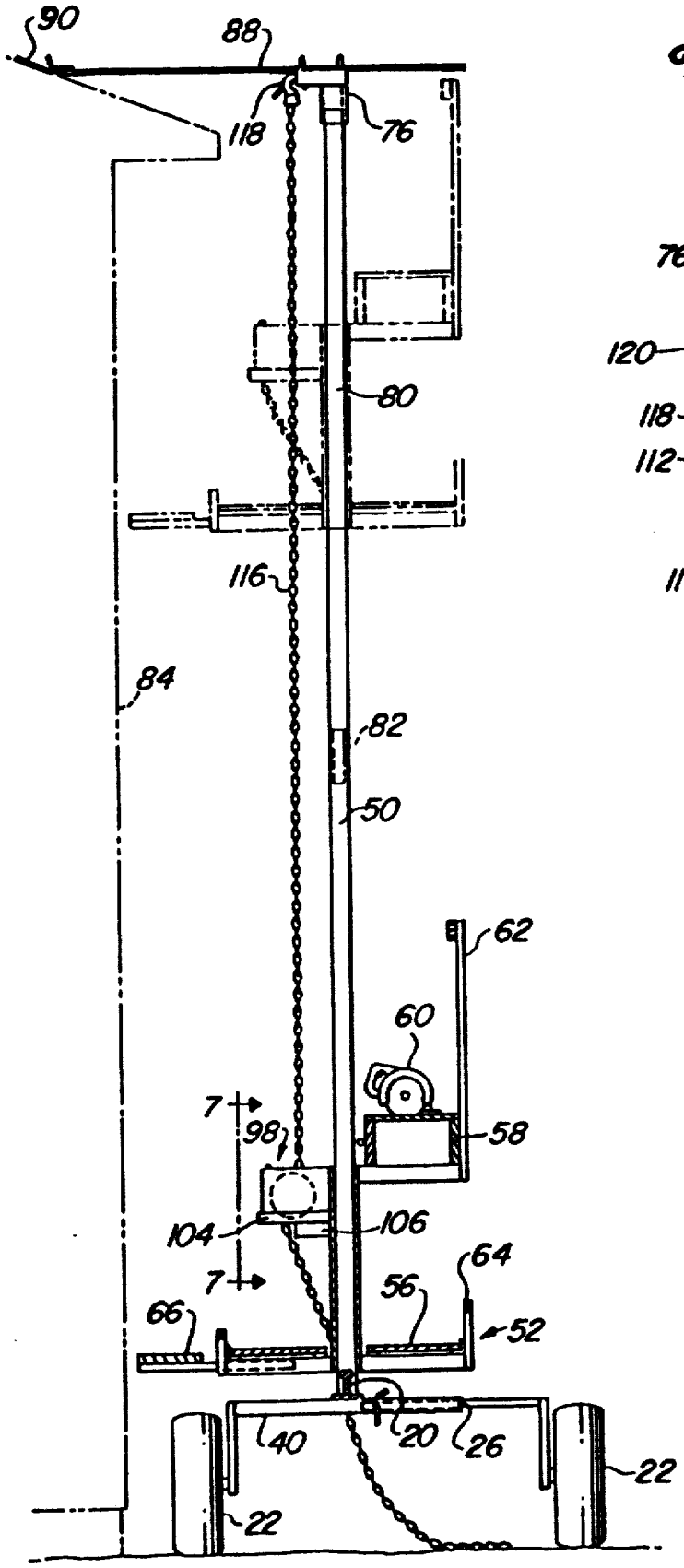
Fig. 2
Fig. 4
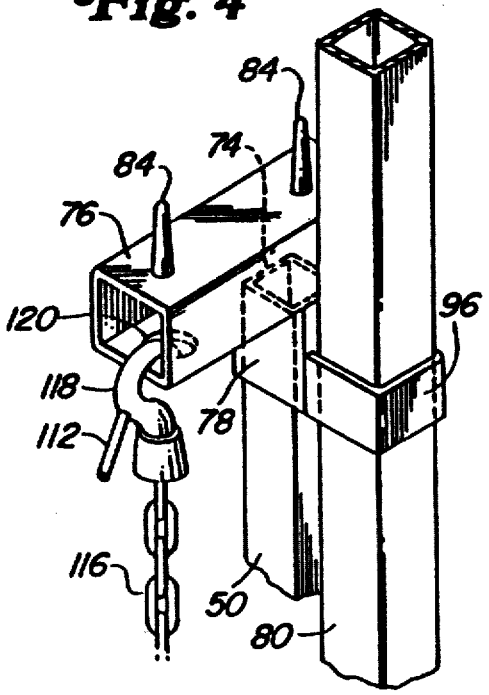
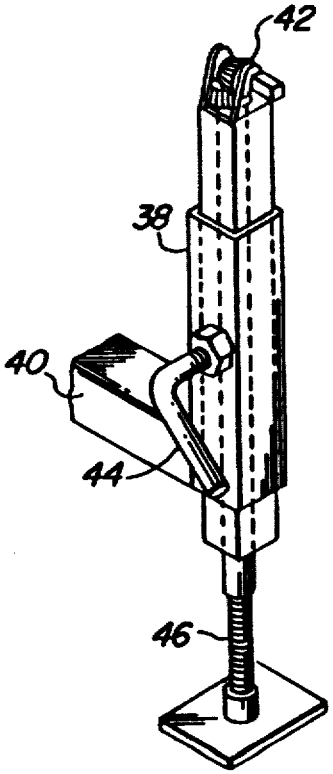
Fig. 3

MOBILE PLATFORM WITH POWER OPERATED PLATFORM ELEVATION

Matter enclosed in heavy brackets [ ] appears in the original patent but forms no part of this reissue specification; matter printed in italics indicates the additions made by reissue.

BACKGROUND AND SUMMARY OF THE INVENTION

Many forms of scaffold structures exist in the prior art for use in working on buildings, etc., as for painting, repairing and the like. Many of these structures are complicated and involve multi-piece construction that must be erected and torn down each time a new site is involved Other types are wheeled for mobility and still others have provision for vertical positioning of a platform. Basically, the prior structures lack convenience, are cumbersome to handle and fail to provide simple, power-operated means for raising and lowering the platform.

According to the present invention, these problems are eliminated by the provision of a scaffold having a horizontally elongated base or chassis form which a pair of rigid masts extend to carry a workman's platform for elevation and descent via power-operated means. It is a feature of the invention that each mast may be extended by adding a supplemental mast. The mast addition or supplement involves a simple telescopic connection. The power means includes a pair of electric chain hoists, one for each mast and the chain from each hoist is connected to the top of a mast or mast extension so that the platform virtually "climbs" the chains during elevation. Another feature is the provision of latches and locks to prevent accidental descent of the platform. A still further feature is the provision of adjustable wheeled axles disposed close together at a midpoint of the chassis, which facilitates mobility of the structure.

The foregoing and other important objects and features of the invention will become apparent from the ensuing description of a preferred embodiment of the invention as shown in the accompanying drawings.

DESCRIPTION OF THE DRAWINGS

FIG. 2 is an end view of the structure with mast prolongation and showing in dotted lines an elevated position of the platform.

FIG. 3 is an enlarged fragmentary perspective of one of the outriggers for stabilizing the structure during use.

FIG. 4 is an enlarged fragmentary perspective of the upper end of a mast showing its removable head as well as a stored mast extension.

DETAILED DESCRIPTION OF A PREFERRED EMBODIMENT OF THE INVENTION

Figure 1:
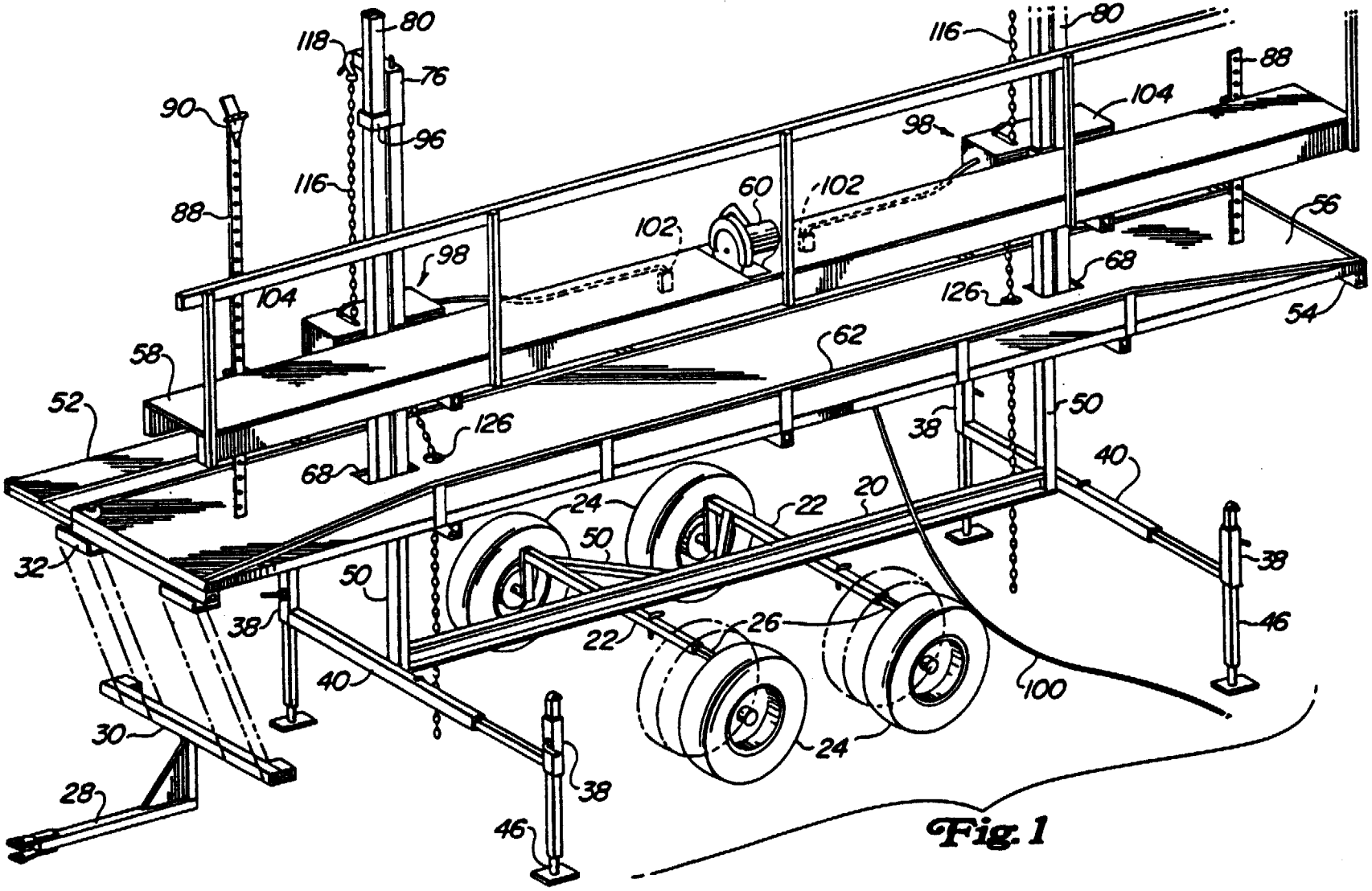
FIG. 1 is a perspective of the overall structure.
Figure 10:
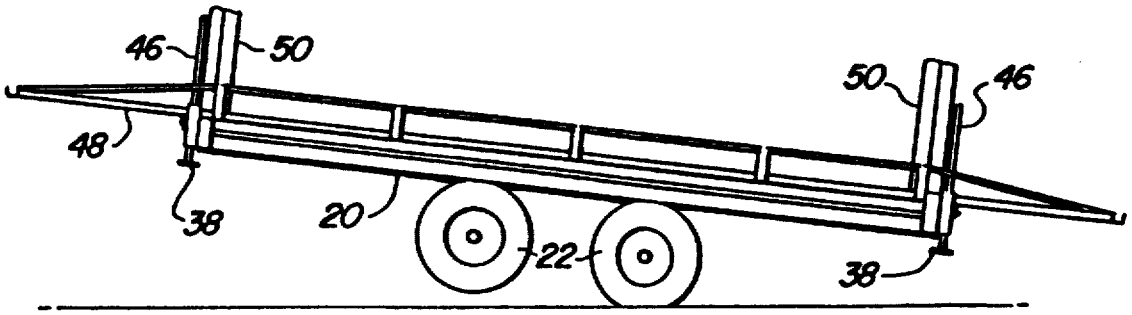
FIG. 10 is an elevation showing the chassis in a tilted position.
Figure 11:
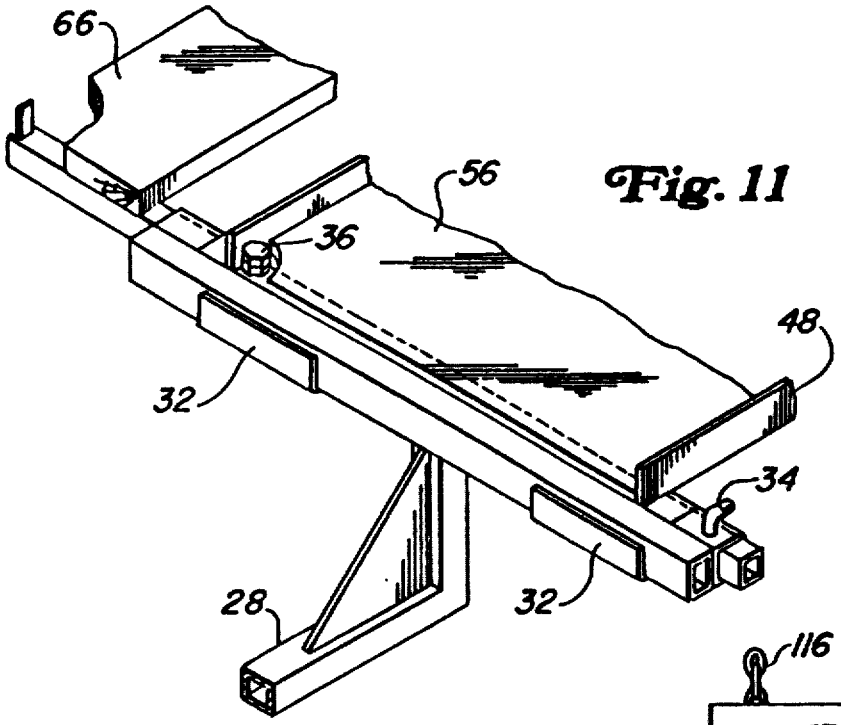
FIG. 11 is a fragmentary perspective showing the removable hitch.

Reference will be had first to FIG. 1 for an overall description of the invention. The numeral (20) denotes an elongated beam forming a base or chassis which is carried amidships by ground-engaging means in the form of a pair of closely spaced apart parallel "arched" axles (22), each having wheels (24) at opposite ends. Each axle is adjustable, as seen at (26), for varying the tread or stance of the wheels. FIG. 1 illustrates the narrow tread of the wheels in broken lines. This tread will be used during towing the scaffold from site to site. The wider tread will be used on site. For towing purposes, the structure is provided at one end with a hitch (28) adapted to be connected to any towing vehicle (not shown). FIG. 1 shows the hitch as disconnected from the structure. FIG. 11 shows the details of the hitch as to its removability, including a square tube (30) as part of the hitch and brackets (32) on the structure, together with releasable securing means (34). A cap screw (36) is one form of means enabling selective lateral positioning of the hitch. For the purpose of stabilizing the structure during on-site use, four outriggers (38) are provided. Each of these includes a laterally extensible and retractable telescopic cross element (40), the fixed part of which is rigidly attached to the chassis. At each end, the outrigger is selectively vertically adjustable, as by means of a screw jack (42) for leveling the scaffold at the job site. Suitable locks (44) are provided to secure the adjusted positions of outrigger legs (46). FIG. 10 shows the legs retracted during transport of the structure. The outriggers do not appear in FIG. 2 because they are concealed behind the wheels (22). FIG. 10 illustrates how the closely spaced positions of the wheeled axles enables tilting of the scaffold to move on only one pair of wheels, with the others clear of the ground, which facilitates manual positioning of the structure at the job site. As best seen in FIG. 1, the fixed parts of the axle cross elements (40) are braced at (48) to the main beam or backbone of the chassis.

The chassis carries a pair of masts (50), each preferably of steel of square tubular section, welded to or otherwise rigidly affixed to the beam (20). A platform is carried by the masts by means that will presently appear. The platform is preferably made up of a plurality of steel frame members (54) for supporting a floor (56), which may be of suitable plywood, planks, etc., for example. The platform carries a work table or bench (58) at a convenient height and a circular saw (60) is shown as a typical tool usable on the table, as for cutting lengths of material, such as lumber, siding, etc. (not shown). Suitable fences (62) and (64) are provided on the platform and a floor extension (66) is shown at one edge of the platform, all in the interests of the convenience of the workmen on the platform. One end of the platform serves to carry the removable hitch (28), previously described. The platform floor has openings (68) for accommodating the masts (50).

Figure 6:
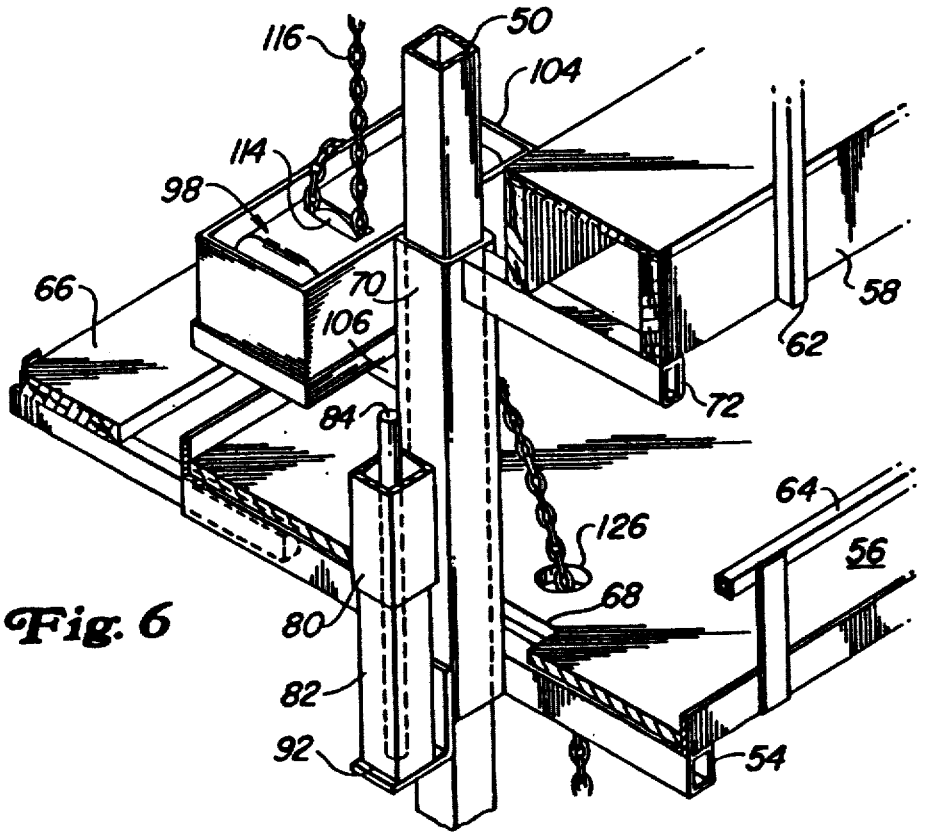
FIG. 6 is an enlarged fragmentary perspective showing the arrangement of part of the platform with one of the masts.

FIGS. 2 and 6 best show the carriage of the platform on the masts. At each mast, the platform is fitted with a guide in the form of a square tube (70) extending vertically between the platform floor (56) and bench (58) and slidable up and down on the associated mast. The length of the guide tube stabilizes the platform against rocking, etc. FIG. 6 also shows a horizontal support (72) for the table or bench (58), it being understood that this construction is duplicated at the mast and other end of the platform. Each mast has an upper terminal end (74) which removably carries a head (76) which has a downwardly opening socket part (78) of square section that fits over the end (74) of the mast (50). Each mast, being also of square tubular section, cooperates with the platform guide tube (70) to prevent relative rotation of the associated parts, including the head (76). The open upper end (74) of each mast enables telescopic receipt of the lower end of a mast extension or supplement (80), which lower end is reduced at (82) (FIGS. 1 and 6) to fit snugly but removably within the open upper end of the main mast (50). The vertical height of the combined masts and mast extensions is seen in FIG. 1 relative to a multi-story structure (84). The top of each head (76) has a pair of upright tapered projections (86) for receiving, among other things, one end portion of a perforated elongated metal strap (88), the opposite end of which is equipped with a hinged part (90), which is also perforated for receiving suitable fasteners such as nails (not shown) for temporary affixation to a part of the site structure, such as the house (84), whereby to brace the masts. Hinging of the part (90) enables accommodation to roofs of different slopes. FIG. 1 shows that the head (76) has been removed from the main mast (50) and fitted to the top of the associated mast extension (80). In the absence of the use of the mast extensions, the straps would be used with the heads as mounted on the masts (50) and attached to lower portions of a structure, as will be evident without further elaboration FIG. 1 shows that the straps, when not in use, are carried by the platform (by suitable means not shown) for ready access to the workmen on the floor of the platform.

Figure 5:
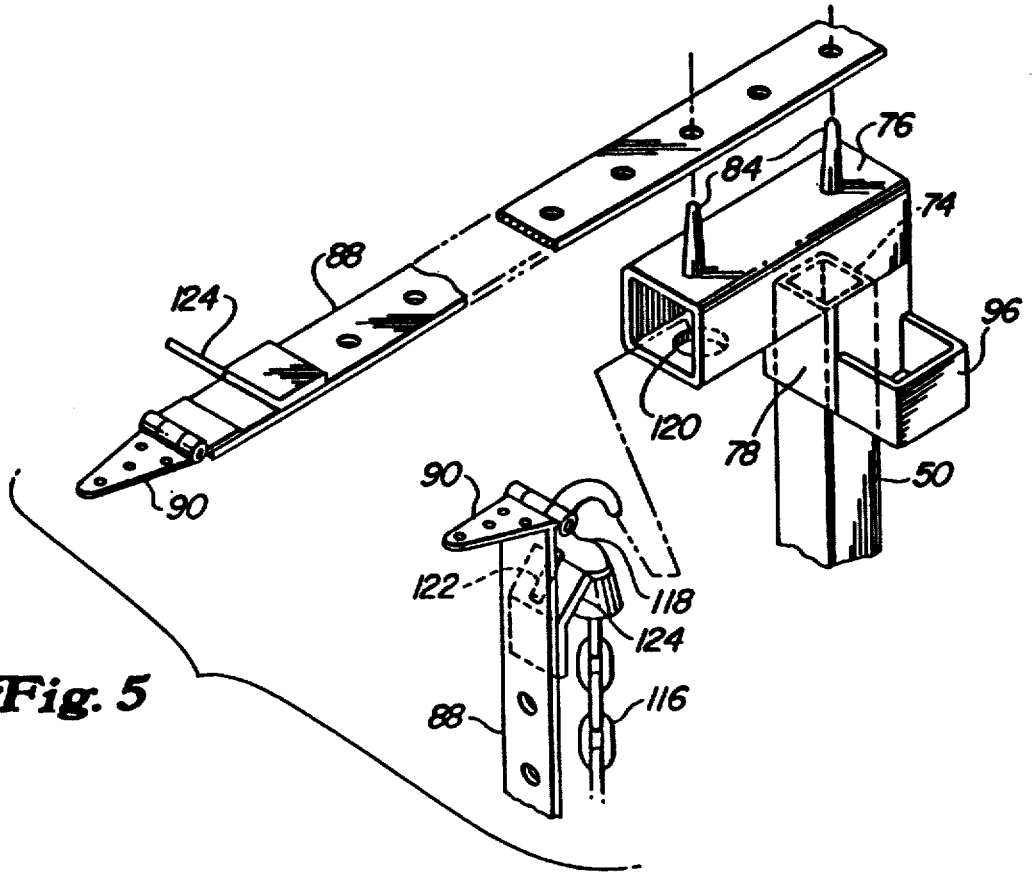
FIG. 5 is an exploded, fragmentary perspective showing how a mast is used with a brace.

FIG. 4, 5 and 6 illustrate how the mast extensions are carried by the platform and masts (50) for easy availability when not in use as extensions of the respective masts. FIG. 6 shows a ledge member (92) affixed to a lower part of the platform guide tube or slide (70). A spindle (94) is welded at its lower end to the ledge and projects a short distance upwardly as a pilot for receiving the lower tubular end (82) of the stored mast extension (80). The mast extension rises from the spindle and ledge closely alongside the mast (50) and the head (76) at the top of the mast has a guide (96) thereon for slidably receiving the upper part of the associated mast extension. The guide-received mast extension is thus carried for ready availability. Since it moves with the platform as just explained, it is conveniently accessible.

Figure 12:
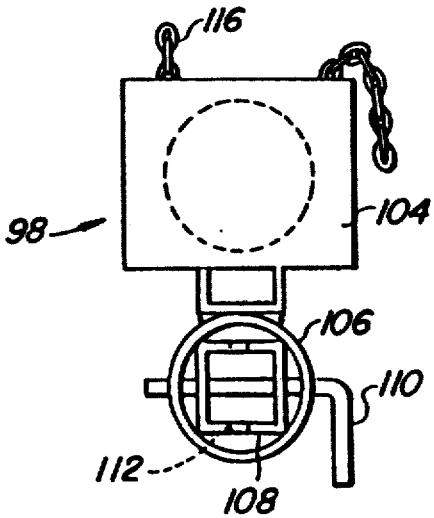
FIG. 12 is a view showing one form of a chain hoist mounted on the platform.

Selective vertical positioning of the platform as to elevation is achieved by a pair of power-operated means, each here being an electric chain hoist (98), fed by a power line (100) and controlled by switches (102). The power line will of course feed the saw (60), the control for which is not shown. Each hoist is carried within a housing (104) of sturdy steel construction mounted rigidly on a support in the form of a pipe (106) of circular section which is in turn bi-positionably carried on a square tube (108) rigidly affixed to and projecting horizontally from the adjacent platform guide (70), it being understood of course that this arrangement is duplicated for both masts. See FIGS. 1 and 12. The chain hoist and its housing are angularly movable about the axis of the square tube and repositionable at a position ninety degrees from that shown in FIG. 12 by means of a releasable lock pin (110) and cooperating holes in the tube (108). The normal position of the hoists for raising and lowering of the platform is as seen in the drawings.

Each hoist includes suitable internal mechanism (not shown in detail) which has a sheave or the like (114) for feeding a chain (116) in and out. Each chain has at one end a hook (118) which is attachable to and detachable from the associated mast head (76) via a suitable opening (120) in the head. For connection of each hook to its associated head while the platform is in a stationary position, each hook carries a fixed peg (112) which is engageable by a lip (124) affixed to a strap (88) (FIGS. 4 and 5) whereby the strap, removed from its storage position on the platform, may be used by a workman to elevate the hook manually to its connection with the head (76). This result obtains for the main mast as well as for the mast extension when fitted with the head that has been removed from the main mast.

When it is desired to move the structure a short distance on the job site, one of the hoists (98) is repositioned so that its chain can extend lengthwise of the platform to some fixed object (not shown) apart from the structure, such as a stump, fixed post, tree or the like. When repositioned the hoist is of course locked by the pin (110) in its new position and relocked when returned to its platform-elevating position, in which case the hoists literally climb up and down the chains as attached to the upper ends of the masts or mast extension. The free ends of the chain extend through suitable openings (126) in the platform and may trail on the ground or be received by suitable receptacles (not shown).

Figure 7:
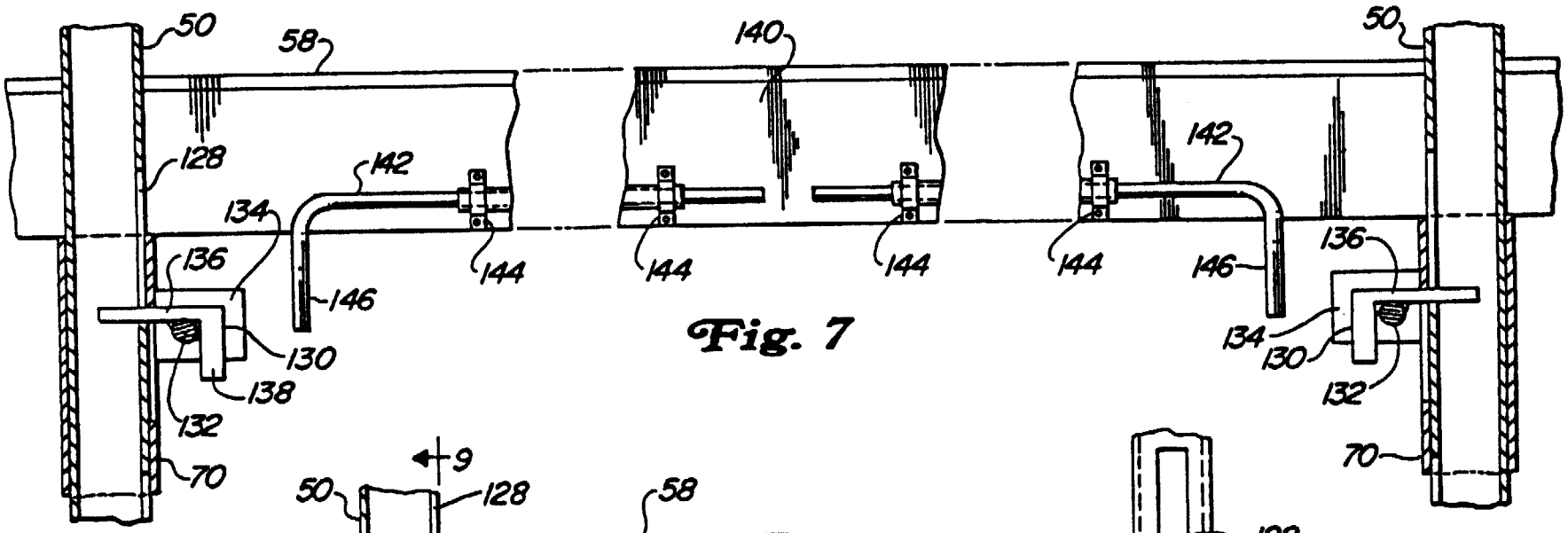
FIG. 7 is an enlarged view as seen along line 7—7 of FIG. 2, with portions broken away to conserve space.
Figure 9:
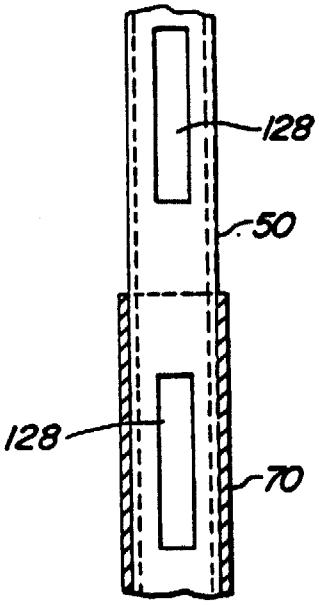
FIG. 9 is a section along the line 9—9 of FIG. 8.
Figure 8:
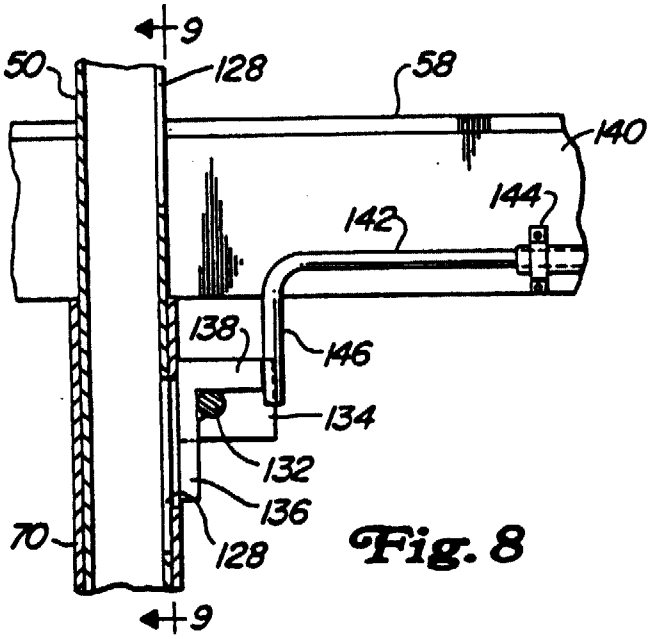
FIG. 8 is an elevation of one end of the FIG. 7 structure with parts in different positions.

FIGS. 7, 8 and 9 show means for retaining the platform at a selected elevation after that elevation has been achieved by energizing of the chain hoists (98). Each mast (50) is provided in one wall thereof with a plurality of openings or slots (128) spaced apart vertically lengthwise of the mast. In a preferred design, the spacing between slots will be on the order of twenty inches. The slots face inwardly toward each other for cooperation with latches (130) carried on pivots (132) forming part of brackets (134) welded or otherwise affixed to the respective platform guides (70). Each latch (130) is in the form of an L having a long leg (136) and a shorter but heavier leg (138). The heavy leg serves as a weight to bias the latch to the position of FIG. 7 so that the longer leg (136) projects through a slot (128) and thus in a position to be engaged by the upper edge of the slot upon limited descent of the platform, whereby the platform will be stopped positively. The bench or table (58) has one side thereof extending lengthwise between the platform guides as a support (140) which carries a pair of L-shaped rods (142) by means of spaced apart bearings (144) that permit both rotation and sliding of the rods. Each rod has a bent end (146) which, as seen in FIG. 2 is retracted away from the respective latches (130). FIG. 8 shows that the latch (130) has been manually turned on its pivot so that the longer leg (136) is clear of the slot (128), which is permitted because of the length of the slot (128) when the platform is power adjusted to a status enabling rocking of the leg out of the slot. In this mode, the associated rod is slid (to the left as seen in FIG. 8) so that the rod end (146) engages the heavy leg (138), thus preventing retro-swinging of the latch and thereby retaining the latch in a position permitting unobstructed vertical movement of the platform on the masts, it being clear that the operation just described is repeated at the other mast and platform slide. The bearings (142) provide enough friction on the rods to prevent unwanted movement of the rods. Reverting again to FIG. 7, it is seen that the leverage set up by the latch design is such that the platform cannot rock the latch as the platform descends. As a further safe-guard, the rods may be moved toward the masts and platform guides to engage the respective latches and prevent rocking thereof out of blocking position.

In use and operation, the scaffold structure is prepared for travel by lowering the platform to its bottom position and attaching the towing hitch (28). The mast extensions will be in their stored positions and the outriggers retracted upwardly and the wheels in narrowed mode. After reaching the job site, the towing vehicle will be disconnected, the hitch will be removed and the outriggers extended to level and stabilize the structure, after which the wheel axles may be extended to wide-tread status as further stabilization of the scaffold. Prior to lowering of the outriggers, it may be found necessary to maneuver the scaffold, which may be done by hand or by use of a repositioned chain hoist and connection of its extended chain to a fixed object. During travel the chains will be retracted through the floor holes (126) and laid on the platform floor in any suitable fashion.

After proper set-up, the power line is connected to a local source (not shown) and the chains extended at their trailing or free ends through the platform holes. The chain hoists are locked in their operative positions and operated to project enough chain to enable hooking of their hooked ends to the mast heads (76). At this point it will be assumed that the mast extensions (80) are not immediately used. The latches (130) and the controls therefor (FIGS. 7, 8 and 9) will be clear of the mast slots and the chain hoists are energized simultaneously via the switches (102) to elevate the platform to a selected position. The hoists are shut off and the latches (130) set in locking mode, all assuming that the platform is at an elevation in which the mast extensions are not required. At this point, the masts may be braced by the straps (88) against the adjacent structure if required, it being noted that, since the straps are stored on the platform, they are readily accessible to workmen on the elevated platform.

In the event that the situation requires the mast extensions (80), the hoists are operated briefly to relax the chains and the hooked ends of the chains are removed from the mast heads (76) and the heads are removed. The stored mast extensions, being carried by the platform (FIG. 6), are easily accessible and are fitted to the open top ends of the respective masts (50), the heads (76) being first added to the top ends of the mast extensions. The workmen then use a strap (88) as a means for attaching the hooked end of the chain to the now higher mast head (76) (FIG. 5), the hoists having been previously operated to project the chains sufficiently for this purpose. Again, the straps (88) may be attached to the adjacent structure as required.

It is seen that the structure is convenient to use and operate. The floor of the platform may carry the necessary material (lumber, siding, etc.) for the particular job. The table or bench (58) provides a ready support for material being worked on, as being cut to length by the saw (60). The several looks and latches provide ample safeguards and stabilizers. Features and advantages other than those pointed out will become apparent to those versed in the art, as will many variations in the embodiment disclosed, all without departure from the spirit and scope of the invention.

I claim:

1. A scaffold structure, comprising an elongated horizontal base having opposite ends, ground-engaging means supporting the base above the ground, a pair of masts spaced apart lengthwise of and rigidly affixed to the base, a platform superimposed over the base, a pair of guide means fixed to the platform and spaced apart according to the masts and cooperating respectively with the masts for guiding the platform for vertical movement relative to the masts, and power-operated means carried by the platform and including driven elements respectively cooperative with the mast for effecting vertical movement of the platform relative to the base and masts; in which the driven element of each power-operated means is rotary and a flexible member engages the rotary element and is collectible to a part of the respective mast at an elevation above the platform and actuation of the power means causes each rotary element to selectively ascent and descend its flexible member for changing the elevation of the platform; including a pair of power-operated means, each having a rotary element cooperating with a flexible element as aforesaid; and, in which at least one of the power-operated means is selectively positionable on the platform between two modes, in one of which its flexible element extends vertically for connection to its mast and in the other of which its flexible element extends horizontally for connection to an object relatively remote from the base.

2. The scaffold structure according to claim 1, including means for selectively locking the one power-operated means in either mode.

3. The scaffold structure according to claim 1, in which the platform has a floor provided with spaced apart openings through which the masts extend.

4. The scaffold structure according to claim 1, including releasable means for locking the platform to the masts at selected heights.

5. The scaffold structure according to claim 1, including a pair of supplemental mast extensions selectively and respectively attachable to the masts as upward prolongations of the masts.

6. The scaffold structure according to claim 5, including means on the platform for storing the mast extensions when detached from the masts.

7. The scaffold structure according to claim 1, in which the ground-engaging means includes a pair of parallel wheeled axles transverse to the length of the base and closely spaced apart substantially midway between the ends of the base.

8. The scaffold structure according to claim 7, in which the axles are selectively adjustable to vary the tread of the wheels.

9. The scaffold structure according to claim 7, including a hitch at one end of the base for effecting towing of the base.

10. The scaffold structure according to claim 7, including ground-engaging outriggers vertically extendibly and retractably carried by the base adjacent to the ends of the base.

11. The scaffold structure according to claim 10, in which the outriggers are selectively adjustable crosswise of the base to vary their stance relative to the base.

12. The scaffold structure according to claim 1, including brace means selectively connectible to and disconnectible from at least one mast and an adjoining structure separate from the scaffold structure for bracing the masts.

13. The scaffold structure according to claim 1, including a pair of supplemental mast extensions selectively and respectively attachable to the masts as upward prolongations thereof, and a pair of telescopic means, one for each mast and its extension, each telescopic means including cooperative parts respectively on the upper end of a mast and the lower end of its extension.

14. The scaffold structure according to claim 13, in which each mast includes a head attached to the upper end of the mast and removable from said upper end and attachable to the upper end of the associated mast extension.

*15. A scaffold structure having wheels for mobility and with a platform adapted to be raised to a predetermined height above the ground, comprising an elongated, horizontal base having opposite ends, ground-engaging means supporting the base above the ground including a pair of wheeled axles disposed transversely of the base and vertically extendable and retractable outriggers carried by the base adjacent to the ends thereof, a pair of masts spaced apart longitudinally of and rigidly affixed to the base, said wheeled axles disposed medially of the length of said base a substantial longitudinal distance inwardly of said masts, said outriggers being disposed longitudinally outward of the wheeled axles a substantial distance, each of said masts being of tubular cross-section, the platform being superimposed over the base, a pair of guide means fixed to the platform and each being of tubular cross-section slidably fitted onto said masts and cooperating respectively with the masts to guide the platform for vertical movement relative to the masts and at least one supplemental mast extension of tubular cross-section attachable to the upper end of each mast as a prolongation of the mast for selectively increasing the overall mast height to said predetermined height above ground level.*

*16. A scaffold structure, as set forth in claim 15, in which said axles are selectively adjustable in length to vary the tread of wheels supported thereon.*

*17. A scaffold structure, as set forth in claim 15, in which said outriggers are also selectively adjustable laterally of the base to vary their stance relative to said base.*

*18. A scaffold structure, as set forth in claim 15, in which power operated means is carried by the platform and includes a flexible driven element, a coupling member and a head member cooperative with each of the masts for effecting vertical movement of the platform relative to the base and masts, each head member being removably attachable to and from each mast and onto each of the mast extensions and each coupling member being removably engageable with each head member whereby the flexible driven element is connectable to the upper end of the mast extensions so that the platform can be raised said predetermined height.*

*19. A scaffold structure, comprising an elongated horizontal base having opposite ends, ground-engaging means supporting the base above the ground, a pair of masts spaced apart lengthwise of and rigidly affixed to the base, a platform superimposed over the base, a pair of guide means fixed to the platform and spaced apart according to the masts and cooperating respectively with the masts for guiding the platform for vertical movement relative to the masts, and power-operated means carried by the platform and including driven elements respectively cooperative with the masts for effecting vertical movement of the platform relative to the base and masts, and further including a pair of supplemental mast extensions selectively and respectively attachable to the masts as upward prolongations of the masts; and*

*means on the platform for storing the mast extensions when detached from the masts.*

* * * * *